Nov. 20, 1928.
W. H. REX
1,692,469
LICENSE PLATE HOLDER
Filed March 28, 1928
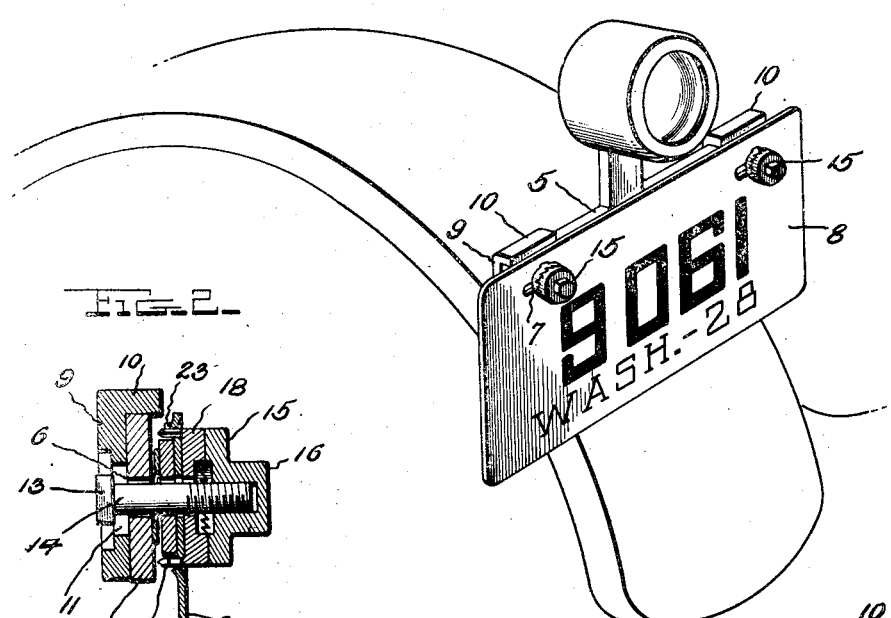
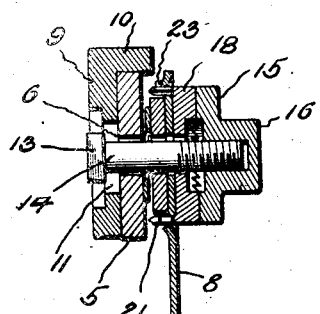
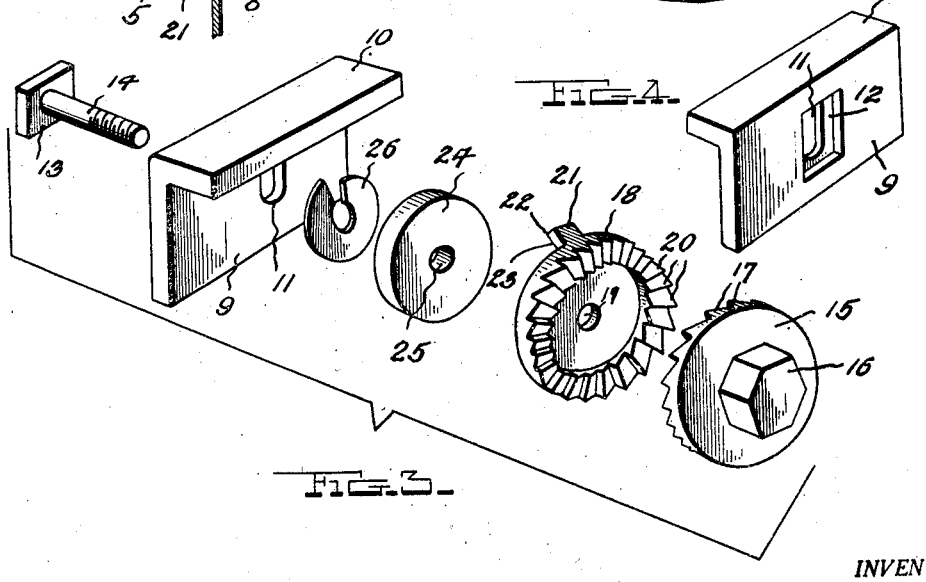
INVENTOR.
Walter H. Rex.
BY
ATTORNEYS.

Patented Nov. 20, 1928.

1,692,469

UNITED STATES PATENT OFFICE.

WALTER H. REX, OF TALLAHASSEE, FLORIDA, ASSIGNOR TO CROREX HOLDING COMPANY, A CORPORATION OF FLORIDA.

LICENSE-PLATE HOLDER.

Application filed March 28, 1928. Serial No. 265,448.

The present invention relates to means for effecting a permanent attachment of a metallic member to a support, being generally of the clamp type wherein nut and bolt means are employed for effecting the attachment. The invention is susceptible of use in many ways and is capable of employment in varied fields of mechanical structural arrangements. The present description and illustration are designed to set forth one practical, physical embodiment of the principles of my invention, in order to comply with the statutes. It is to be understood that the specific illustration does not constitute a limitation of the invention, but is merely to be construed as a showing of the best means I have thus far devised for carrying the invention into effect.

At this time the most useful field for the invention appears to me to be in connection with automobile license plates. Heretofore, it has been possible to effect an easy removal of license plates after they are secured on an automobile, so that it quite frequently happens license plates are stolen from automobiles and used for criminal purposes upon other machines in an effort to confuse identity, and this practice has occasioned much trouble for automobile owners and the authorities. In this particular art my invention is designed, and has for one of its objects, to provide a means whereby an automobile license plate may be attached to its supporting bar for a permanent mounting, and whereby any attempt to remove the license plate results in a permanent mutilation of the plate in such degree that its further use is rendered impossible. Other objects are: to provide a novel attaching means for automobile license plates; to provide an attaching means for automobile license plates wherein means are provided for piercing the plate upon attachment, which means operates to cut a portion from the plate when the attaching means is sought to be removed; to provide a novel form of nut and bolt mechanism having means intermediate a nut and bolt head for effecting a cutting action upon a member clamped between the nut and bolt head; to provide a novel form of nut lock means; and generally to provide an improved mounting for automobile license plates.

With these general objects and such others in view as will be apparent from the description, the invention resides in the novel construction, combination and arrangement of parts herein after described and claimed and illustrated in the accompanying drawings, in which:—

Figure 1 is a perspective of a license plate mounted in accordance with the principles of this invention.

Figure 2 is a vertical section taken through the means for securing the plate upon its support.

Figure 3 is a group perspective illustrating the assembly of the attaching means shown in Figure 2.

Figure 4 is a perspective of an anchor lug employed in the assembly.

As shown in Figures 1 and 2, 5 designates the conventional license plate holder bar of an automobile provided with the conventional slot 6 for receiving therethrough a stem of a bolt, which, in accordance with present conventional practice, is passed through apertures 7 provided in a license plate 8, the plate being clamped against its supporting bar by the usual nut threaded over the stem of the bolt. This is the usual manner of attaching license plates and it is obvious that plates may be removed without difficulty.

In carrying out the principles of my invention, I provide an anchor lug 9 having a flat body portion adapted to be disposed in contact with the rear face of the holder bar 5, being supported thereon by a flange 10 formed integral with the body 9 and adapted to seat over and upon the top edge of the holder bar, as best shown in Figure 2. This anchor lug is formed with an elongated slot 11 positioned for registry with the slot 6 formed in the holder bar 5 and adjacent the rear face of the anchor lug. The slot 11 is enlarged into a countersunk socket 12 of substantially rectangular formation to receive and anchor the rectangular head 13 of a bolt stem 14 which is extended through the anchor lug and holder bar to project an appreciable distance beyond the opposite side thereof.

The bolt stem 14 is threaded at its outer end to receive thereover a cap nut 15 having a tool engageable portion 16. The inner face of the nut 15 is provided with an annular series of ratchet teeth 17 having their inclined faces disposed in the direction of rotation of the nut in its advancing movement over the bolt stem. Cooperating with the nut 15 is an annular follower member 18 having a central bore 19 of sufficient diameter to permit of the follower member being loosely engaged over the bolt stem for freedom of rotary and longitudinal movement thereon.

As best shown in Figure 4, the outer face of the follower member 18 which is disposed adjacent the nut 15, is formed with an annular series of teeth 20 which are complemental to the teeth 17 carried by the nut, and the opposite face of the follower has formed thereon at a plurality of diametrically opposed spaced points, laterally extending lugs 21 which are shaped to form entrant points 22 and knife edges 23, which knife edges are active only in a counter clockwise direction relative to rotation over the bolt stem. Acting in conjunction with the nut and follower, is a disc shaped bearing member 24 provided with a central bore 25 for its reception over the bolt stem 14, with the diameter of the disc 24 being less than the distance between diametrically opposed knife lugs 21 on the follower 18. A split spring washer 26 is also employed in the assembly.

In attaching a license plate to its holder in accordance with this invention, the anchor lug 9 is first positioned at the back of the holder bar 5 and the bolt stem passed through the respective slots 11 and 6 with its head 13 seated in the countersunk holding socket 12, whereby rotation of the bolt stem is prevented. The washer 26 is then applied over the threaded end of the bolt stem to rest against the outer face of the holder bar and the bearing disc 24 is then positioned over the bolt stem to bear against the washer 26. Following this the license plate 8 is mounted in the usual manner over the bolt stem 14, which stem is received through the slot or aperture 7 provided for that purpose in the face of the plate. When the plate is applied the follower member 18 is then slid over the projecting end of the bolt stem and rotated thereon to bring the entrant points of the knife lugs 21 into engagement with the plate at the desired points. The nut 15 is then threaded over the bolt stem and advanced in the usual manner with the results that the interengagement of the teeth 17 and 20 force the follower 18 longitudinally over the bolt stem and under continued advancement of the nut, the knife lugs 21 will pierce and be forced through the body of the license plate, as shown in Figure 2. Inasmuch as the washer 26 and bearing disc present an effective retaining surface, there will be no undue bending of the material of the plate, and the knife lugs 21 can pass readily through the plate and extend over the periphery of the bearing disc 24 rearwardly of the license plate. This piercing movement of the follower is accomplished without rotation of the follower over the bolt stem, as there is a slipping engagement of the teeth 17 and 20 throughout the advancing movement of the nut.

However, should it be desired to unscrew the nut 15 and remove the plate from its holder, it will be found impossible to do so without cutting out an appreciably large portion of the plate. In the retracting movement of the nut 15, the teeth 17 engage with the teeth 20 on the follower 18 so as to cause a simultaneous rotation of the follower whereby the knife lugs 21 present the knife edges 23 in an advancing movement, bringing about the cutting out of all that portion of the license plate which is included within a circle described by the knife lugs during their rotation. The area of the cutout portion depends, of course, upon the diameter of the follower 18, but it is sufficiently large so that the license plate is mutilated beyond repair and cannot be further employed.

It will be obvious that the particular nut and bolt assembly may be employed in connection with securing closure plates of containers wherein it is desired that the containers cannot be opened without destroying the closure plate, so as to prevent further use of the container. There are many other fields of usefulness and I again desire to have it understood that the invention is not to be limited by the terms employed in this description and illustration of an operative embodiment thereof.

I claim:

1. The combination with an automobile license holder and a license plate adapted to be supported thereon, of a bolt having its head disposed in anchored engagement with said support, the stem of said bolt extending through said license plate, a nut threaded on said bolt for clamping said plate against said support, a rotary cutter movable longitudinally over said bolt for penetrating engagement in said license plate upon advancing movement of said nut, and means on said nut for rotating said cutter upon retractive movement of said nut.

2. The combination with an automobile license plate holder having a license plate disposed thereon, of a bolt extending through said holder and plate, an annular bearing member disposed between said plate and holder and supported on said bolt, a nut threaded on said bolt for clamping said plate in position on said support, a follower movable longitudinally over said bolt between said nut and the plate, spaced knives on said follower and adapted to penetrate through said plate beyond the periphery of said annular member under advancing movement of said nut, and interengaging means on said nut and follower for rotating said knife members about the periphery of said annular member under retractive movement of said nut.

3. A device of the character described comprising an anchor member having a socket formed in one face thereof, a bolt extending through said member and having its head seated in said socket against rotation, a cap nut threaded over the end of said bolt, a follower longitudinally and rotatably movable over said bolt and between said nut and anchor member, means on said nut for moving said follower longitudinally on the bolt during advancing movement of said nut, means on said nut for rotating said follower simultaneously with said nut during retractive movement of the nut, spaced knife members extending laterally from one face of said follower adjacent the peripheral edge thereof, and an annular bearing member movable longitudinally over said bolt between said follower and anchor member, the diameter of said annular member being less than the distance between oppositely spaced knife members on said follower.

In testimony whereof I affix my signature.

WALTER H. REX.